I. H. DEXTER.
FLEXIBLE COUPLING.
APPLICATION FILED JAN. 31, 1916.
1,190,870.
Patented July 11, 1916.
2 SHEETS—SHEET 1.
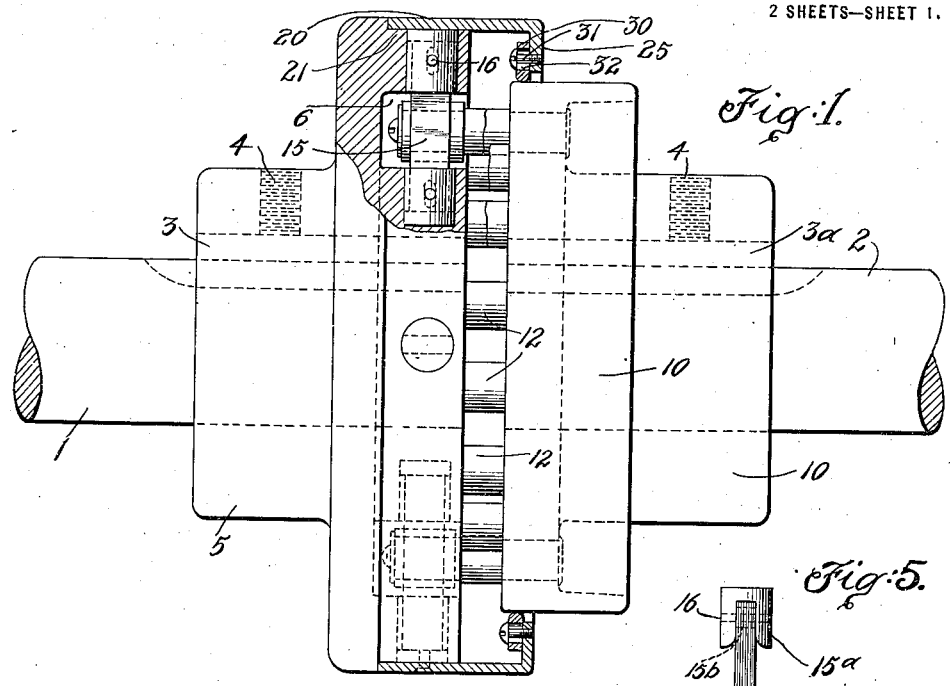
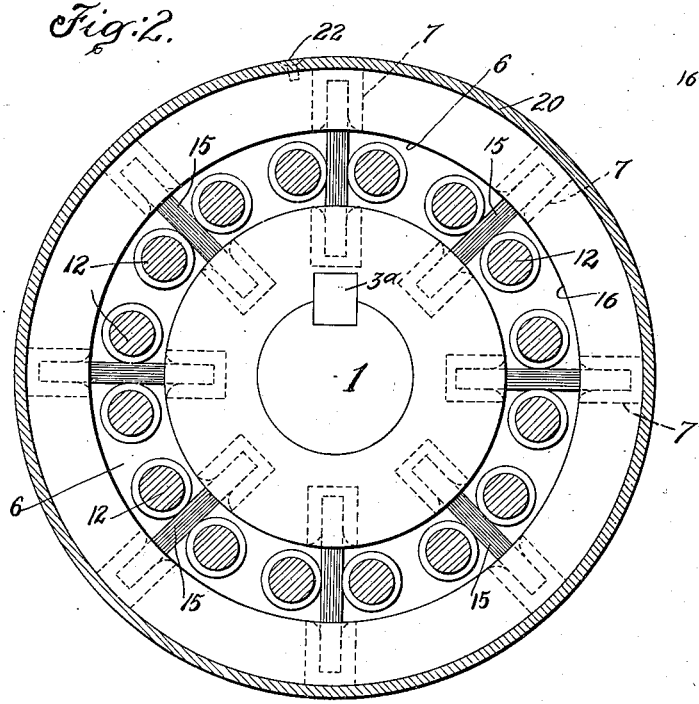
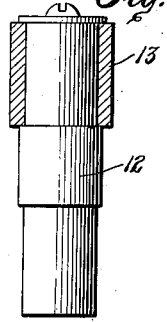
Inventor
Irven H. Dexter,
By his Attorneys

I. H. DEXTER.
FLEXIBLE COUPLING.
APPLICATION FILED JAN. 31, 1916.

1,190,870.

Patented July 11, 1916.
2 SHEETS—SHEET 2.

Inventor
Irven H. Dexter
By his Attorneys

UNITED STATES PATENT OFFICE.

IRVEN H. DEXTER, OF PEARL RIVER, NEW YORK, ASSIGNOR TO I. H. DEXTER CO., INC., OF NEW YORK, N. Y., A CORPORATION OF NEW YORK.

FLEXIBLE COUPLING.

1,190,870.          Specification of Letters Patent.      Patented July 11, 1916.

Application filed January 31, 1916. Serial No. 75,474.

*To all whom it may concern:*

Be it known that I, IRVEN H. DEXTER, a citizen of the United States, residing at Pearl River, in the county of Rockland and State of New York, have invented certain new and useful Improvements in Flexible Couplings, of which the following is a full and clear specification.

The present invention relates to improvements in flexible shaft couplings which are designed to unite two shafts and automatically compensate for all imperfections in alinement; and the object of the present invention is to improve the general construction of such couplings to provide for greater flexibility and more uniformity of operation.

The improved coupling comprises two coupling members constructed to be attached to the adjacent ends of two shafts, and provided with two kinds of coupling elements, one in the form of flat springs (preferably laminated), set in sockets extending radially of the supporting coupling member, and the other in the form of studs (preferably carrying anti-friction rollers) which extend parallel with the axis of their supporting member and engage the flat faces of the spring coupling elements. By mounting the spring coupling elements for axial turning in positions radial to the coupling members, it will be understood that as the two coupling members rotate upon their respective axes, the spring coupling elements will automatically present their working faces in proper angular planes to afford accurate line engagement between the spring and stud elements. The automatically adjustable spring coupling elements absorb all shocks and backlash.

In the preferred form of the invention, each coupling member is provided with alternating spring and stud elements so arranged that the spring elements on one member will be engaged by the stud elements on the other member. In another form of the invention, all the spring elements are carried by one coupling member and all the stud elements by the other coupling member.

Figure 3:
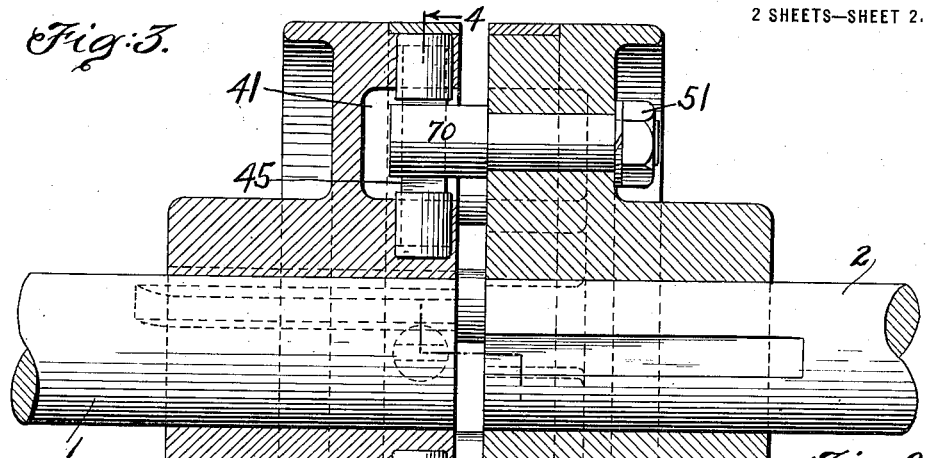
Figure 4:
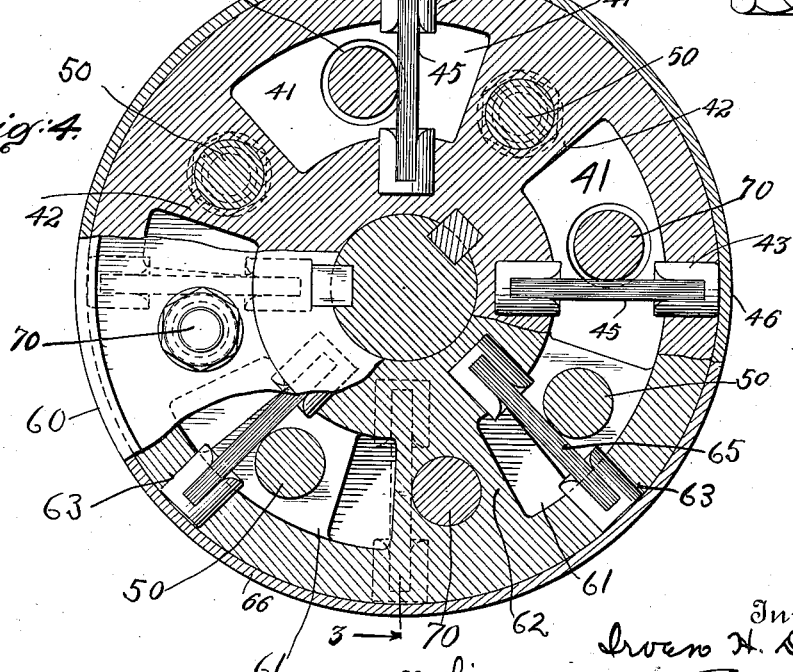

In the accompanying drawings, Figure 1 is a side elevation of one form of my improved flexible coupling, parts being broken away to show the interior arrangement; Fig. 2 is a transverse vertical sectional view of the same; Fig. 3 is a vertical longitudinal sectional view of the preferred form of my invention, taken on the line 3—3 of Fig. 4; Fig. 4 is a transverse sectional view of the same taken on the line 4—4 of Fig. 3; Figs. 5, 6, 7 and 8 are enlarged detail views illustrating features of the two kinds of coupling elements employed.

The improved coupling shown in its simplest form in Figs. 1 and 2, embodies two main coupling members 5 and 10, which are designed to be secured upon the adjacent ends of two shafts, indicated at 1 and 2. The coupling members may be secured upon the shafts by means of the ordinary keys 3, 3ª, fitting suitable keyways and held by set screws 4.

The coupling member 5 is in the form of a heavy steel disk, extending concentrically from its integral supporting hub, and has formed in its inner face a deep circular channel 6 and a plurality of radially extending cylindrical recesses 7, which are intersected between the hub and rim portions of the coupling member by the circular channel 6.

Spring coupling elements 15 are mounted in the radial recesses 7 of coupling member 5. Each of these spring elements 15 is preferably formed of a number of thin leaf springs secured at their ends by the bearing thimbles 15ª. The ends of the springs are slotted, as shown at 15ᵇ, and cross pins 16 pass through the slots of said springs and are seated in openings in the bearing thimbles. These bearing thimbles may be short cylindrical sections, slotted longitudinally for the reception of the ends of the springs. The thimble members at the opposite ends of the spring elements are freely journaled in the inner and outer portions of the radial recesses 7, above referred to. The springs proper, between the thimble ends, traverse the circular channel 6 and are exposed therein for the engagement of the stud coupling elements of the other coupling member presently to be referred to.

20 is a circular shell or casing seated upon the slightly reduced portion 21 of coupling member 5 and closing the outer openings of radial recesses 7, for retaining the spring coupling elements in position in said recesses. This shell 20 may be secured in place by any suitable means, such for instance, by the screw 22 shown in Fig. 2.

The second coupling member 10, which is a flanged disk of steel somewhat smaller than the member 5, is provided on its inner face with a number of rigidly mounted studs 12, suitably secured in the face of the disk and projecting parallel to the axis of shaft 2 in a circular series around said shaft. These studs 12 carry upon their outer ends the anti-friction collars or rollers 13, secured in any suitable manner, such as shown, and these anti-friction bearing collars engage the flat faces of the spring coupling elements exposed in the circular channel 6. It will be observed with reference to Fig. 2 of the drawing that the studs 12 are arranged in pairs, so as to be presented upon opposite faces of the spring coupling elements 15, which arrangement effectively provides for the coöperation of the driving and driven coupling members and for taking up back lash, no matter which member is used for driving or which direction the coupled shafts rotate.

The circular casing 20 is provided with an inturned circular flange 25 which surrounds, and is spaced from, the outer flanged portion of coupling member 10. A packing ring or washer 30, formed with an enlarged opening snugly fitting the outer surface of member 10 is secured to the inner face of flange 25 by means of set screws 31 passing through radial slots 32 of the ring and seated in flange 25. This ring 30 has its inner bearing face curved transversely so as to form a line contact with the cylindrical outer surface of the coupling member 10. It will be observed that in the changing angular relation between the two coupling members that the packing ring 30 is free to move radially upon the inturned circular flange 25 of casing 20, while at the same time it retains its snug sliding engagement with the cylindrical surface of member 10, providing a practically grease-tight joint.

Either coupling member may be considered as the driving member. Assuming the member 10 is operating as the driver it will be clear that in rotating to the right, in Fig. 2, that the studs at the rear of the spring members will push against the spring members for rotating the driving member 5. The springs yield slightly, depending upon their resilience and the resistance encountered, the springs moving slightly in their bearing thimbles to permit flexure, and the bearing thimbles turning freely in the socket bearings to present the flat face of the springs in the changing angular planes to maintain line contact with the studs. All shocks and back lash are effectively taken up by the flexibility of the spring coupling elements. The coupling permits greater flexibility by reason of the freedom of movement of the pairs of studs in radial planes, as well as longitudinally of the couplings.

In Figs. 3 and 4 of the drawings I have illustrated a further development of my invention which I prefer as a practical embodiment. In this preferred form the two coupling members, indicated at 40 and 60 are of exactly the same construction and each carries a plurality of both the spring and stud forms of coupling elements which interlock and coöperate for effecting a yielding flexible joint between the coupled shafts. The coupling member 40, keyed, or otherwise secured to the shaft 1, resembles an ordinary pulley in outward appearance. This member 40 is formed in its inner face with a series of four curved recesses 41, arranged concentrically around the shaft 1 and leaving between them radial solid portions 42 for the purpose presently to be explained. Radially extending recesses 43 extend from the outer rim into the hub portion of member 40. The inner and outer portions of each radial recess 43 open into one of the curved recesses 41, adjacent to one end thereof. 45 are the spring coupling elements constructed as above described and specifically illustrated in Fig. 5 of the drawings. The bearing thimbles at the opposite ends of these spring elements 45 are freely journaled in the inner and outer parts of radial recesses 43, so as to prevent the springs across the circular recesses 41. These springs 45 are free to move upon their longitudinal axes, radially of the coupling member 40, and, by reason of the pin and slot connection between the springs and their bearing thimbles, are free to flex circumferentially of member 40. The circular retaining band 46 is seated in the circular recess 40ª of member 40 for closing the outer ends of radial recesses 43 and retaining the spring members in place.

Mounted in each of the radial solid portions 42, of coupling member 40, is a coupling stud 50, projecting parallel with shaft 1. These coupling studs may be constructed as hereinbefore described in reference to Figs. 1, 2 and 6 of the drawings, but they are preferably constructed as shown in detail in Figs. 7 and 8 of the drawings, in which each stud 50 is adjustably seated in a cylindrical opening in wall member 42 and secured in the desired adjusted position therein by means of the nut 51, threaded upon the end of stud 50 and engaging a lock washer 52. The stud 50 is formed with a bearing end 53, which is formed eccentric with respect to the supporting portion of the stud and carries a freely journaled anti-friction roller or collar 54, which is preferably formed with a shallow peripheral groove. The studs constructed as explained are adjustable in their supports to enable them to be first placed in operative relation to the spring elements of the coöperating coupling member and then be turned in their supports to bring the anti-friction collars upon the eccentric portions of the studs in engagement with the springs with the desired pressure, the studs being then locked in this adjusted position.

The member 40 is also formed with a series of four circular openings 40^b, extending parallel with the shaft 1, and in communication with the circular recesses 41, approximately in line with the stud elements of the coöperating coupling member when the coupling is assembled. The purpose of these circular openings is to facilitate the assembling of the coupling by providing means for inserting the studs in one member through the circular openings of the other member.

Figure 7:
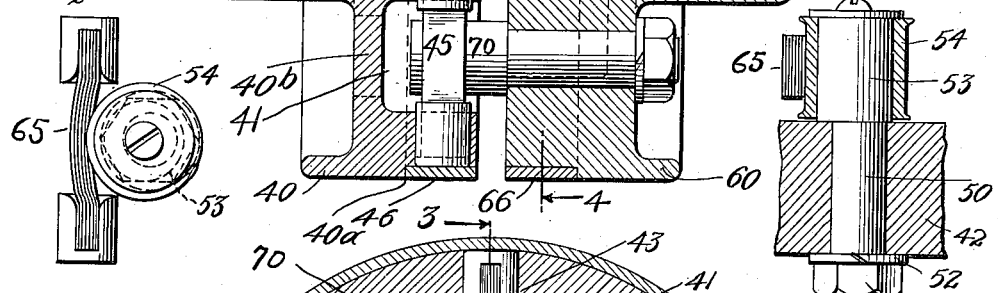
Figure 8:
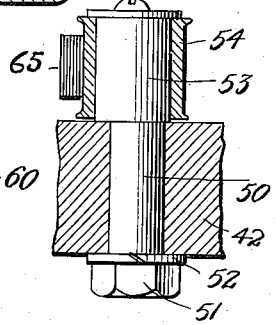

The second coupling member 60 which, as stated above, is of the same construction as the member 40, is provided with the circular series of curved recesses 61, the radial solid wall portions 62, the radial recesses 63, the spring elements 65 mounted in the recesses 63, and the stud elements 70, mounted in radial portions 62 and constructed preferably as illustrated in Figs. 7 and 8 of the drawings. The member 60 is also formed with a series of circular openings (not shown) extending parallel with shaft 1, and leading into recesses 61 to approximately aline with the stud elements of member 40. The mentioned elements of coupling member 60 have all the features of the same elements above described in connection with the coupling member 40, so that it will be unnecessary to duplicate their description.

In assembling this preferred form of flexible coupling it will be understood that the two members 40 and 60 are presented face to face with the projecting stud elements of both adjusted to enter the curved recesses freely alongside the spring elements with which they coöperate. It will be clear that each stud element of one coupling member coöperates with one of the spring elements of the other coupling member. When the two members are placed together the individual stud elements are adjusted, as above described, for moving the eccentric portions toward the springs to place the springs under the desired tension to prevent lost motion and backlash.

The assembling of the parts is simple where the point of application upon the shaft is free of access, but it sometimes happens that such flexible couplings have to be applied to heavy machinery in places which do not afford means for the convenient assembling of the parts. In such difficult locations the provision of openings through the coupling members, for insertion of stud elements, will be found an added convenience.

The great advantages of my improved form of flexible coupling are its simplicity of construction, its great flexibility without reduction in strength and its freedom from lost motion and backlash, while at the same time it provides the requisite cushion or shock absorber between the driving and driven shafts.

I claim:

1. A flexible coupling comprising two shaft coupling members, and coöperating coupling elements, carried by said coupling members, the elements on one of said coupling members being free to turn upon axes radial to the coupling.

2. A flexible coupling comprising two shaft coupling members, spring elements mounted upon one of said members to turn upon axes radial thereto, and suitable means of driving engagement between said spring elements and the other coupling member.

3. A flexible coupling comprising two shaft coupling members and coöperating spring and stud coupling elements carried by said coupling members, the spring elements of which are mounted thereon to turn upon axes radial to said coupling.

4. A flexible coupling comprising two shaft coupling members and coöperating spring and stud coupling elements carried by said coupling members, the spring elements being mounted to turn upon axes radial to said coupling and the stud elements being mounted approximately parallel with the axis of rotation of the coupling.

5. A flexible coupling comprising two shaft coupling members, and spring and stud coupling elements carried upon each of said coupling members, the spring elements being mounted to turn upon axes radial to said coupling and the stud elements being mounted approximately parallel with the axis of rotation of the coupling.

6. A flexible coupling comprising two shaft coupling members, and a plurality of spring and stud coupling elements carried upon each of said coupling members, the spring elements being mounted to turn upon axes radial to said coupling and the stud elements being mounted approximately parallel with the axis of rotation of the coupling, and the spring elements of one member being operatively engaged by the stud elements of the other member.

7. A flexible coupling comprising two shaft coupling members and coöperating spring and stud coupling elements carried by said coupling members, the spring elements of which are formed with flat faces and mounted to turn upon axes radial to the coupling, and the stud elements are mounted approximately parallel with the axis of rotation of the coupling.

8. A flexible coupling comprising two shaft coupling members and coöperating spring and stud coupling elements carried by said coupling members, the spring elements being in the form of flat springs mounted to turn freely upon axes radial to the coupling to present their flat faces in different angular planes, and the stud elements mounted parallel with the axis of rotation and engaging the flat faces of the spring elements.

9. A flexible coupling comprising two shaft coupling members, each formed with a recessed face and radial recesses intersecting the face recesses, coupling elements freely journaled in said radial recesses and exposed in said face recesses, and other coupling elements mounted upon said coupling members approximately parallel with the axis of rotation and projecting into said face recesses in engagement with the coupling elements in said radial recesses.

10. A flexible coupling comprising two shaft coupling members, each formed with a recessed face and radial recesses intersecting the face recesses, spring coupling elements formed with end bearing thimbles freely journaled in said radial recesses and exposed in said face recesses, and stud coupling elements mounted upon said coupling members approximately parallel with the axis of rotation and projecting into said face recesses in engagement with the spring coupling elements in said radial recesses.

11. In a coupling, the combination with relatively movable coupling members, each formed with a series of radial recesses, coupling elements supported in said recesses, coupling studs mounted upon said coupling members and extending approximately parallel to the axis of rotation, said studs engaging said radial coupling elements, and circular bands surrounding said coupling members and retaining said coupling elements in said radial recesses.

12. A flexible coupling comprising two shaft coupling members, and a series of alternately arranged spring and stud coupling elements carried upon each coupling member, the spring elements being mounted radially of the coupling members and the stud elements being mounted approximately parallel with the axis of rotation of the coupling, each of the spring elements being operatively engaged by one of the stud elements.

13. A flexible coupling comprising two shaft coupling members each formed in its face with a circular series of recesses separated by radial wall portions, and a series of radial recesses leading into said face recesses, spring coupling elements freely journaled in said radial recesses and exposed in said face recesses, and stud coupling elements secured to and projecting from said radial wall portions approximately parallel with the axis of rotation, each of the spring elements being engaged by one of the stud elements.

14. A flexible coupling, comprising two shaft coupling members and coöperating spring and stud coupling elements carried by said coupling members, the spring elements being mounted to turn freely upon axes radial to the coupling, and the stud elements being adjustably mounted parallel with the axis of rotation, and adapted to be adjusted toward and away from said spring elements.

15. A flexible coupling, comprising two shaft coupling members and coöperating spring and stud coupling elements carried by said coupling members, the spring elements being mounted to turn freely upon axes radial to the coupling, and the stud elements being formed with bearing portions and spring engaging portions which are relatively eccentric and said bearing portions of the stud elements being adjustably mounted in the coupling members approximately parallel with the axis of rotation, whereby the spring engaging portions of the stud elements can be adjusted toward and away from said spring elements.

IRVEN H. DEXTER.